US011981131B2

(12) United States Patent
Kanno et al.

(10) Patent No.: US 11,981,131 B2
(45) Date of Patent: May 14, 2024

(54) PRINT ELEMENT SUBSTRATE AND TEMPERATURE DETECTION APPARATUS

(71) Applicant: CANON KABUSHIKI KAISHA, Tokyo (JP)

(72) Inventors: Hideo Kanno, Kanagawa (JP); Nobuyuki Hirayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 17/828,774

(22) Filed: May 31, 2022

(65) Prior Publication Data

US 2022/0388302 A1 Dec. 8, 2022

(30) Foreign Application Priority Data

Jun. 3, 2021 (JP) ................................ 2021-093618

(51) Int. Cl.
*B41J 2/045* (2006.01)

(52) U.S. Cl.
CPC ......... *B41J 2/04563* (2013.01); *B41J 2/0455* (2013.01); *B41J 2/0458* (2013.01)

(58) Field of Classification Search
CPC .... B41J 2/04563; B41J 2/0455; B41J 2/0451; B41J 2/04541; B41J 2/04543; B41J 2/04548; B41J 2002/14354
See application file for complete search history.

(56) References Cited

U.S. PATENT DOCUMENTS

| | | | |
|---|---|---|---|
| 7,559,626 B2 | 7/2009 | Sakurai et al. | |
| 7,802,866 B2 | 9/2010 | Kanno et al. | |
| 8,632,150 B2 | 1/2014 | Kasai et al. | |
| 8,740,350 B2 | 6/2014 | Sakurai et al. | |
| 8,794,733 B2 | 8/2014 | Kanno et al. | |

(Continued)

FOREIGN PATENT DOCUMENTS

| | | | |
|---|---|---|---|
| JP | 2012250511 A * | 12/2012 | ........... B41J 2/0451 |
| JP | 5474136 B2 | 4/2014 | |

OTHER PUBLICATIONS

Sugano, Machine Translation of JP-2012250511-A, 2012 (Year: 2012).*

(Continued)

*Primary Examiner* — Scott A Richmond
(74) *Attorney, Agent, or Firm* — VENABLE LLP

(57) ABSTRACT

A print element substrate comprises print elements generating thermal energy for ejecting liquid; and a temperature detection element circuit including temperature detection elements provided corresponding to each of the print elements, and reading temperature information by selectively energizing one of the temperature detection elements, wherein the temperature detection element circuit includes: a signal processing portion outputting a selection signal having a second voltage amplitude larger than a first voltage amplitude, based on an input signal having the first voltage amplitude; a selection switch provided for each of the plurality of temperature detection elements, selecting the temperature detection element; and a first read switch provided for each of the plurality of temperature detection elements, reading a voltage of a terminal of one of the temperature detection element selected by the selection switch, and wherein the selection switch and the first read switch are driven by using the selection signal.

12 Claims, 13 Drawing Sheets

(56) References Cited

U.S. PATENT DOCUMENTS

| | | | |
|---|---|---|---|
| 10,308,021 B2 | 6/2019 | Nomura et al. | |
| 2007/0291081 A1 | 12/2007 | Kanno et al. | |
| 2010/0321439 A1 | 12/2010 | Kanno et al. | |
| 2021/0094286 A1* | 4/2021 | Kanno | B41J 2/14153 |
| 2021/0187941 A1 | 6/2021 | Kasai et al. | |
| 2021/0229431 A1* | 7/2021 | Umeda | B41J 2/04563 |

OTHER PUBLICATIONS

Copending U.S. Appl. No. 17/886,646, filed Aug. 12, 2022 (available on USPTO system).

1 Extended European Search Report dated Jan. 26, 2023, in counterpart application EP 22176043.2 (6 pages).

* cited by examiner

PRINT ELEMENT SUBSTRATE AND TEMPERATURE DETECTION APPARATUS

BACKGROUND OF THE INVENTION

Field of the Invention

The present disclosure relates to a print element substrate and a temperature detection apparatus

Description of the Related Art

Japanese Patent No. 5474136 discloses a print element substrate capable of detecting a temperature of a print element. The print element substrate includes a plurality of temperature detection elements provided corresponding to each of the plurality of print elements. In the disclosed substrate, a selection switch for selecting a temperature detection element and a read switch for reading out a terminal voltage of the temperature detection element selected by the selection switch are provided for each temperature detection element.

In such substrate, terminal voltages at both terminals of the temperature detection element are read out as temperature detection signals (temperature information). On the basis of the temperature detection signal, it is possible to determine a print element having an ejection failure.

SUMMARY OF THE INVENTION

By increasing the terminal voltage of the temperature detection element, the S/N ratio of the temperature detection signal can be increased, and as a result, the judgment accuracy of the ejection failure can be improved. In order to increase the terminal voltage of the temperature detection element, it is necessary to increase the power supply voltage to increase an operating range of a current source for supplying the constant current to the temperature detection element. In this case, the terminal voltage of the temperature detection element may not be accurately read unless the control voltage of the selection switch or the read switch is amplified in accordance with the expansion of the operating range of the current source. U.S. Pat. No. 5,474,136 does not describe the amplification of the control voltage of such a select switch or a read switch.

It is an object of the present disclosure to increase the S/N ratio and to accurately read the terminal voltage of the temperature detection element.

For achieving the above objectives, according to an aspect of the present disclosure, a print element substrate according to an aspect of the present disclosure, comprises a plurality of print elements configured to generate thermal energy for ejecting liquid; and a temperature detection element circuit including a plurality of temperature detection elements provided corresponding to each of the plurality of print elements, configured to read temperature information by selectively energizing one of the plurality of temperature detection elements, wherein the temperature detection element circuit includes: a signal processing portion configured to output a selection signal having a second voltage amplitude larger than a first voltage amplitude, based on an input signal having the first voltage amplitude; a selection switch provided for each of the plurality of temperature detection elements, configured to select the temperature detection element; and a first read switch provided for each of the plurality of temperature detection elements, configured to read a voltage of a terminal of one of the temperature detection element selected by the selection switch, and wherein the selection switch and the first read switch are driven by using the selection signal.

Furthermore, according to another aspect of the present disclosure, a temperature detection apparatus comprises: a temperature detection element; a current source configured to apply a constant current to the temperature detection element; a first MOS transistor wherein one terminal of two terminals other than a gate terminal is connected to one of terminals of the temperature detection element, and the other terminal of the two terminals is connected to the current source and a selection signal is supplied to the gate terminal; and a second MOS transistor wherein one terminal of two terminals other than a gate terminal is connected to a line connecting one of terminals of the temperature detection element with the one terminal of the first MOS transistor, and the selection signal is supplied to the gate terminal, wherein a voltage amplitude value of the selection signal is amplified so that the value obtained by subtracting the threshold voltage between the gate terminal and the one terminal of the second MOS transistor from the voltage applied to the gate terminal becomes larger than a value of a terminal voltage generated at one of the terminals of the temperature detection element when the constant current is applied to the temperature detection element via the first MOS transistor.

Further features of the present invention will become apparent from the following description of exemplary embodiments with reference to the attached drawings.

DESCRIPTION OF THE EMBODIMENTS

Embodiments of the present disclosure will now be described in detail with reference to the drawings. However, the components described in the embodiments are merely examples and are not intended to limit the scope of the present disclosure to them.

First Embodiment

Figure 1A:
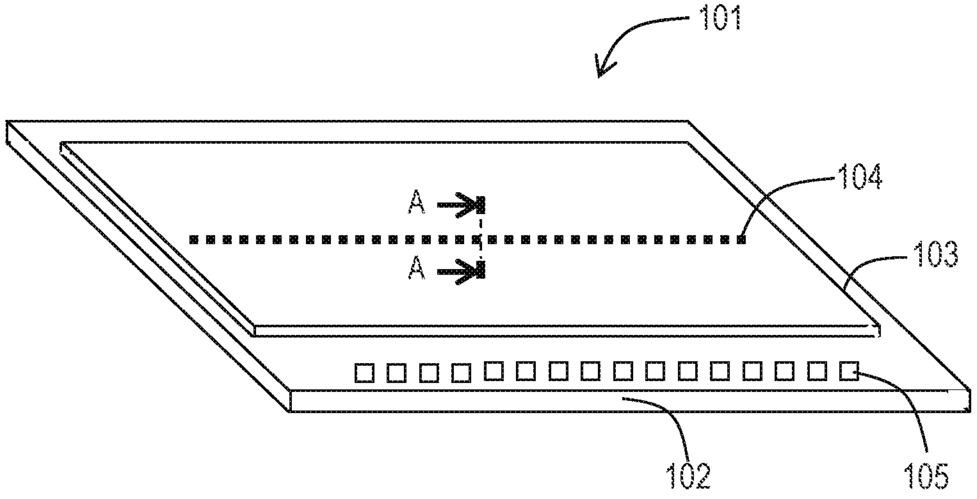
FIG. 1A is a diagram schematically showing a configuration of a print element substrate according to a first embodiment of the present disclosure.
Figure 1B:
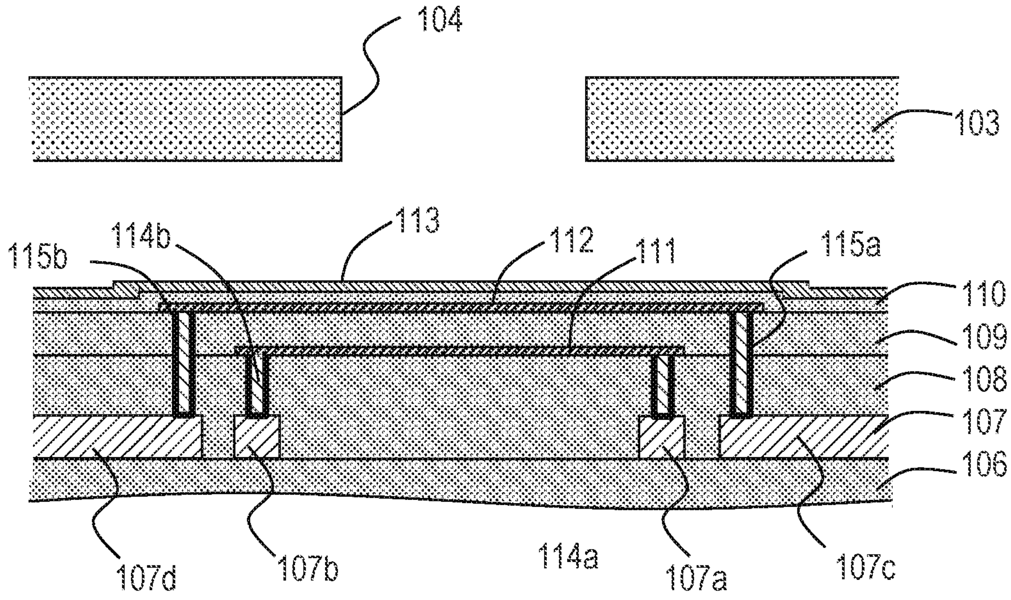
FIG. 1B is a diagram schematically showing a configuration of a cross sectional view in A-A section of the print element substrate shown in FIG. 1A.

FIG. 1A is a diagram schematically showing a configuration of a print element substrate 101 according to a first embodiment of the present disclosure. FIG. 1A is an external view of the print element substrate 101 when viewed from the side of an ejection port 104. FIG. 1B is a cross sectional diagram schematically showing a cross sectional view of the print element substrate 101 along the line A-A in FIG. 1A.

As shown in FIG. 1A, a channel forming member 103 is provided on a silicon substrate 102. The channel forming member 103 is made of a photosensitive resin or the like and has a plurality of ejection ports 104 for ejecting liquid such as ink. A plurality of terminals 105 electrically connected to external wire are formed on the upper surface of the silicon substrate 102. Here, the ejection ports 104 are arranged in a line, but the number of the ejection ports 104 and the number of the lines can be suitably changed.

As shown in FIG. 1B, a print element 112 for generating thermal energy for ejecting a liquid and a temperature detection element 111 are provided in a region facing the ejection port 104. Specifically, an insulating film 106, a wire layer 107, and an interlayer insulating film 108 are laminated on the silicon substrate 102 in this order. The wire layer 107 includes wires 107*a* to 107*d* made of aluminum or the like. The temperature detection element 111 is formed on the interlayer insulating film 108. The temperature detection element 111 is a thin film resistor made of titanium, a titanium nitride laminated film, or the like.

Conductive plugs 114*a*, 114*b* made of tungsten or the like are provided so as to penetrate the interlayer insulating film 108. One end of the temperature detection element 111 is electrically connected to the wire 107*a* via the conductive plug 114*a*, and the other end of the temperature detection element 111 is electrically connected to the wiring 107*b* via the conductive plug 114*b*.

An interlayer insulating film 109 is laminated on an interlayer insulating film 108 on which a temperature detection element 111 is formed. The print element 112 is formed on the interlayer insulating film 109. The print element 112 is a heating resistor made of a tantalum silicon nitride film or the like. Conductive plugs 115*a*, 115*b* made of tungsten or the like are provided so as to penetrate through the interlayer insulating film 108 and the interlayer insulating film 109. One end of the print element 112 is electrically connected to the wire 107*c* via the conductive plug 115*a*, and the other end of the print element 112 is electrically connected to the wire 107*d* via the conductive plug 115*b*.

A protective film 110 such as a silicon nitride film is laminated on an interlayer insulating film 109 on which the print element 112 is formed, and a cavitation resistant film 113 such as tantalum is formed on the protective film 110. Although the temperature detection element 111 is disposed directly below the print element 112 via the interlayer insulating film 109, a location of the temperature detection element is not limited to this structure. The temperature detection element 111 may be formed in the same layer as the print element 112, or may be provided above the print element 112 via an interlayer insulating film.

Figure 2A:
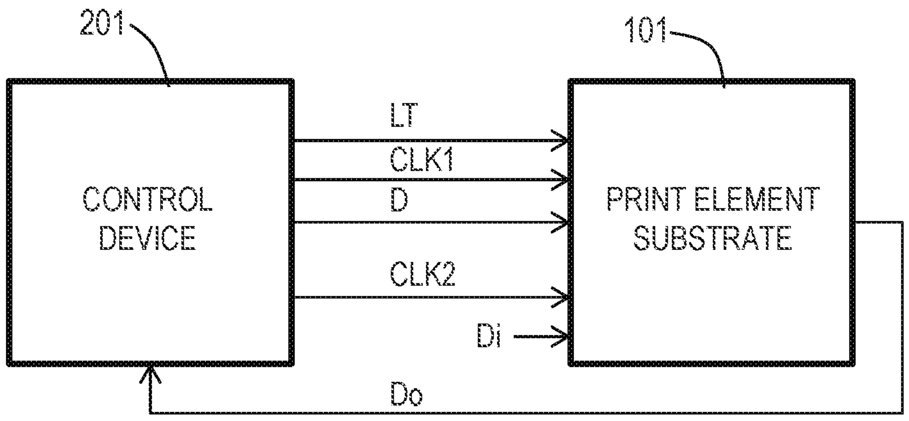
FIG. 2A is a diagram for explaining wiring between the print element substrate and the control device.
Figure 2B:
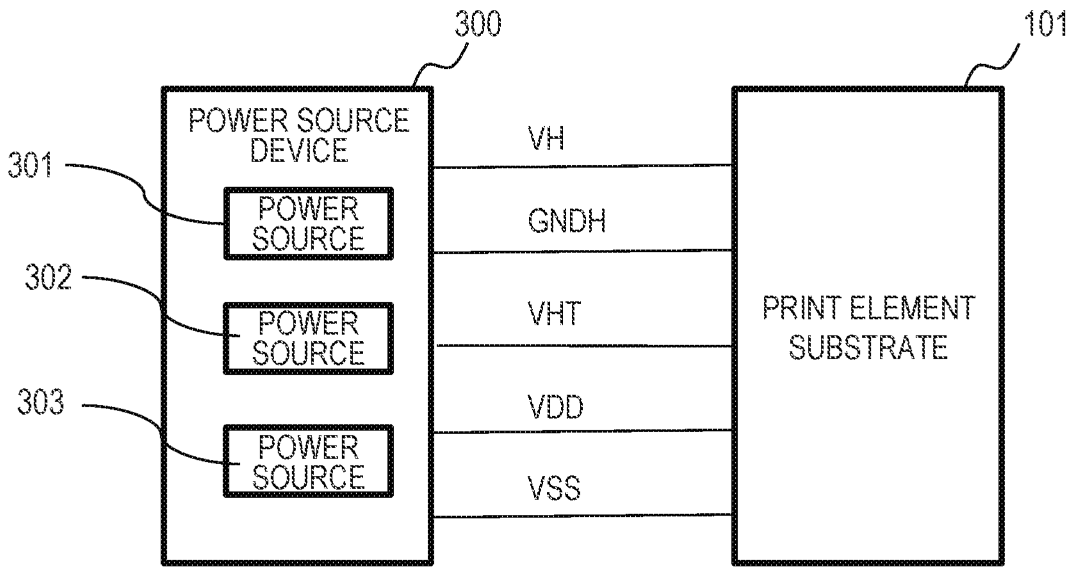
FIG. 2B is a diagram for explaining wiring between the print element substrate and the power supply device.

FIGS. 2A and 2B are diagrams for explaining the wires between the print element substrate 101 and the control device 201, and the print element substrate 101 and the power source device 300. FIG. 2A is a connection diagram between the print element substrate 101 and the control device 201. FIG. 2B is a connection diagram between the print element substrate 101 and the power source device 300.

As shown in FIG. 2A, the print apparatus includes the control device 201 for controlling the print element substrate 101. The control device 201 generates a signal (including print control information, print information, and ejection inspection control information) for controlling the ejection operation of the print element substrate 101. For example, the control device 201 outputs a block signal LT, a transfer clock signal CLK, a serial data signal D of control information, a serial data signal Do of determination data, and a transfer clock signal CLK2. Here, the block signal LT marks a block time for time-division driving the plurality of print elements 112 in block units. The transfer clock signal CLK2 is a clock signal for transferring the serial data signal Do.

As shown in FIG. 2B, the print apparatus includes a power source device 300 for supplying power to the print element substrate 101. The power source device 300 has a power source 301, a power source 302, and a power source 303. The power source device 300 supplies the voltage VH (24V), the voltage VHT (5V), and the voltage VDD (3.3V) to the print element substrate 101. A ground GNDH corresponding to VH and a ground VSS corresponding to each of VDD and VHT are provided between the power source device 300 and the print element substrate 101 in addition to VH, VHT and VDD. VH, VHT, and VDD can be referred to as positive power source voltages, and VSS can be referred to as negative power source voltages.

Figure 3:
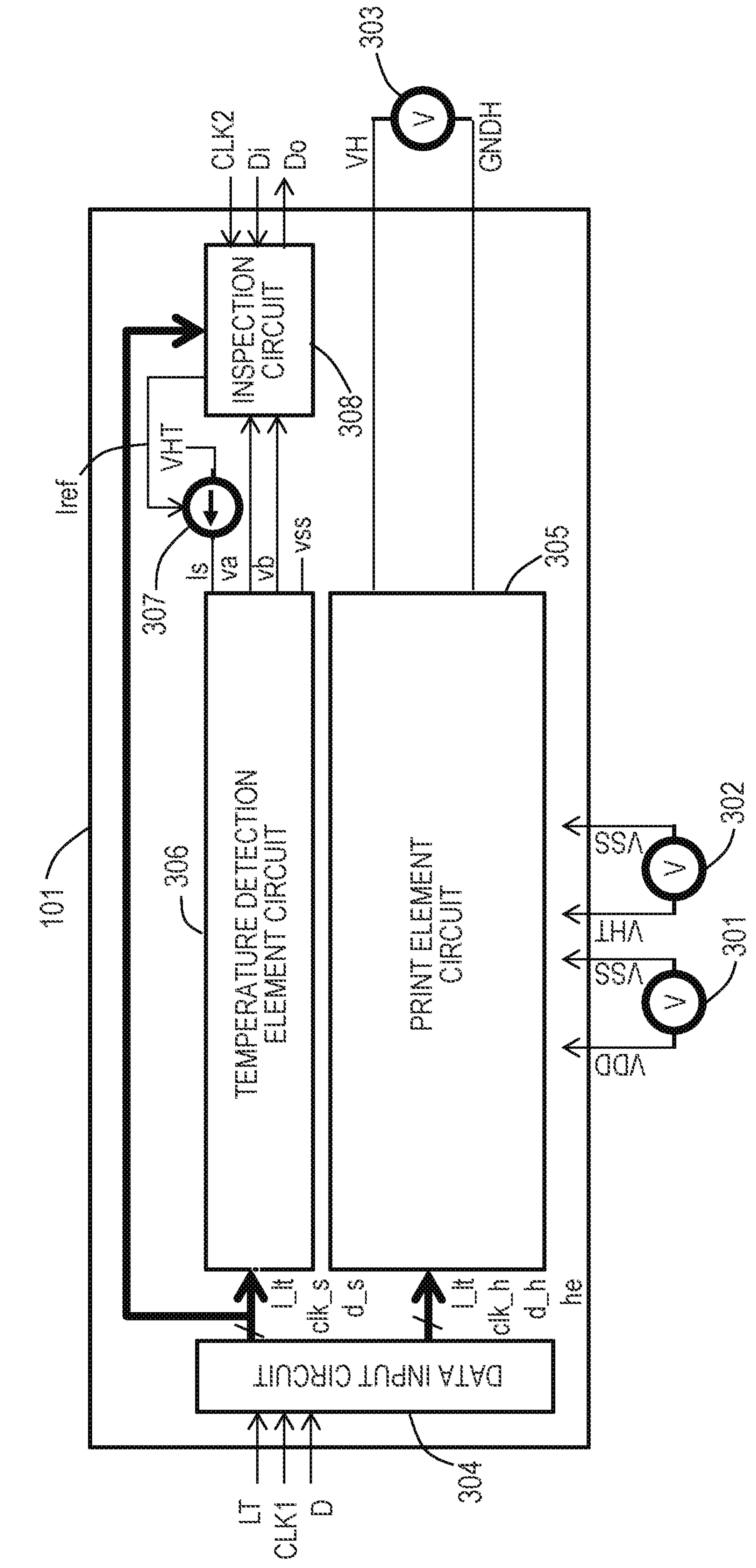
FIG. 3 is a circuit diagram showing a configuration of a print element substrate.

FIG. 3 is a circuit diagram showing the configuration of the print element substrate 101. The print element substrate 101 includes a data input circuit 304, a print element circuit 305, a temperature detection element circuit 306, a current source 307, and an inspection circuit 308. Here, the print element circuit 305 includes a plurality of print elements 112 arranged in a row, and the temperature detection element circuit 306 includes a temperature detection element 111 corresponding to each of the print elements 112. For example, the temperature detection element 111 is disposed in the vicinity of the print element 112.

The power source 301 supplies the power source voltage VDD to the print element substrate 101. The power source 302 supplies the power source voltage VHT to the print element substrate 101. The power source 303 supplies the power source voltage VH to the print element substrate 101. A temperature detection element circuit 306 is driven by using a power source voltage VDD and a power source voltage VHT. A print element circuit 305 is driven by using a power source voltage VH, a power source voltage VDD, and a power source voltage VHT. A current source 307 is driven by the power source voltage VHT. The current source 307 supplies a constant current Is to the temperature detection element circuit 306.

The data input circuit 304 receives the block signal LT, the transfer clock signal CLK1, and the serial data signal D, which are generated by the control device 201. The data input circuit 304 expands the data and sends signals to the circuits of the print element substrate 101. For example, the data input circuit 304 supplies signals l_lt, clk_h, d_h, and he to the print element circuit 305. The print element circuit 305 is driven in time division according to signals l_lt, clk_h, d_h and he. The signal l_lt is a latch signal for an internal circuit, generated from the trailing edge of the block signal LT with a predetermined pulse width. The signal clk_h corresponds to the transfer clock signal CLK1. The signal d_h is for sending time-division driven data (serial data). The signal he is an applied signal that drives the print element 112.

The data input circuit 304 supplies signals l_lt, clk_s, d_s to the temperature detection element circuit 306 and the inspection circuit 308. The signals l_lt, clk_s and d_s are a latch signal, a transfer clock signal and serial data, respectively. The latch signal l_lt, the transfer clock signal clk_s, and the serial data d_s correspond to the latch signal l_lt, the transfer clock signal clk_h, and the serial data d_h, respectively.

The temperature detection element circuit 306 reads temperature information by selectively energizing one of the plurality of temperature detection elements 111. In the temperature detection element circuit 306, the temperature detection element 111 is selected based on the latch signal l_lt, the transfer clock signal clk_s and the serial data d_s, and the selected temperature detection element 111 is connected to the current source 307. Terminal voltages Va and Vb at both ends of the temperature detection element 111 are output to the inspection circuit 308. The terminal voltage Va is a voltage generated at one terminal (a terminal on the high potential side) of the temperature detection element 111, and the terminal voltage Vb is a voltage generated at the other terminal (a terminal on the low potential side) of the temperature detection element 111.

In the inspection circuit 308, parameters for adjusting inspection conditions are set based on the latch signal l_lt, the transfer clock signal clk_s and the serial data d_s, and the timing of inspection is determined. The inspection circuit 308 receives a temperature waveform inputted through terminal voltages va and vb at both ends of the temperature detection element 111. The inspection circuit 308 executes signal processing and determination processing, and outputs the determination data as serial data signal Do synchronized with the serial transfer clock signal CLK2 for each block time LT.

Figure 4A:
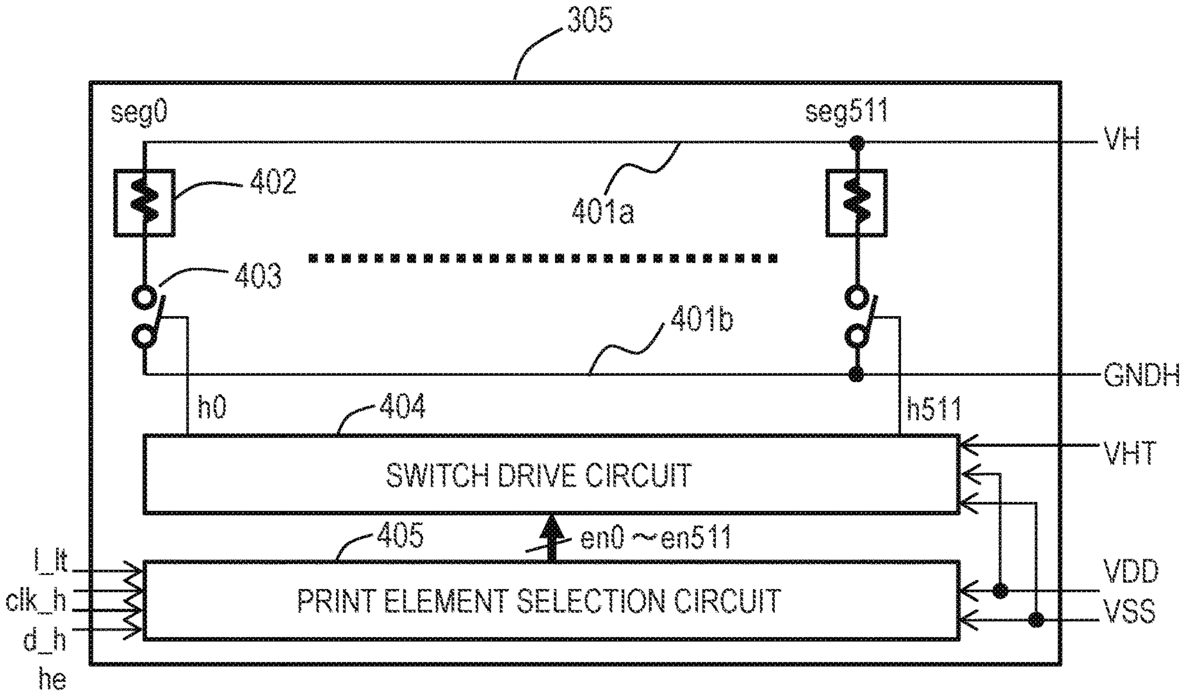
FIG. 4A is a diagram for explaining the configuration of the print element circuit.
Figure 4B:
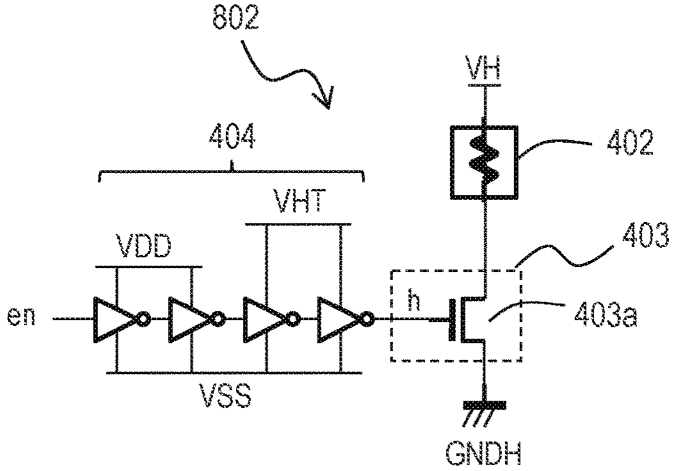
FIG. 4B is a diagram for explaining the configuration of the print element circuit.

FIGS. 4A and 4B are diagrams for explaining the configuration of the print element circuit 305. FIG. 4A is a block diagram showing the configuration of the print element circuit 305. FIG. 4B is a circuit diagram showing a segment circuit 802 of a print element for 1 segment. In FIGS. 4A and 4B, the print element 402 corresponds to the print element 112 shown in FIG. 1B.

As shown in FIG. 4A, the print element circuit 305 has segments seg0 to seg 511. Segments seg 0 to seg 511 correspond to a configuration in which 512 print elements 402 are provided in one row, and each segment has a print element 402 and a drive switch 403. One terminal of the print element 402 is connected to a power source line 401*a* which is a common wire of the power source voltage VH. The other terminal of the print element 402 is connected to one terminal of the drive switch 403. The other terminal of the drive switch 403 is connected to a ground line 401 *b* which is a common wire of the ground GNDH. The ground line 401*b* is a return destination of the power source voltage VH.

The print element circuit 305 includes a switch drive circuit 404 for driving the drive switches 403 of the segments seg0 to seg 511, and a print element selection circuit 405. The switch drive circuit 404 and the print element selection circuit 405 are connected to the power source line of the power source voltage VDD and the ground line of the ground VSS, respectively. The switch drive circuit 404 is further connected to the power source line of the power source voltage VHT.

The print element selection circuit 405 comprises a shift register and a decoder. The print element selection circuit 405 receives the latch signal l_lt, the transfer clock signal clk_h, the serial data d_h, and the application signal he, and generates a row signal and a column signal for time division drive. The print element selection circuit 405 outputs an on/off signal en obtained by logical AND (AND) of the row signal and the column signal. The voltage amplitude of the on/off signal en corresponds to the voltage value of the power source voltage VDD.

The switch drive circuit 404 amplifies the voltage amplitude of the on/off signal en outputted from the print element selection circuit 405. Specifically, the switch drive circuit 404 converts the on/off signal en having a small amplitude whose voltage amplitude value corresponds to the power source voltage VDD into the drive signal h having a large amplitude whose voltage amplitude value corresponds to the power source voltage VHT. The drive signal h includes drive signals h0 to h511 corresponding to segments seg0 to seg 511. In accordance with the drive signal h0, the drive switch 403 of the segment seg0 is turned on/off. Similarly, in accordance with the driving signals hl to h511, the drive switches 403 of the segments seg1 to seg 511 are turned on/off.

In the segment circuit 802 of the print element shown in FIG. 4B, the switch drive circuit 404 is composed of an inverter that operates using the power source voltage VDD and an inverter that operates using the power source voltage VHT. The switch drive circuit 404 outputs a driving signal h obtained by boosting the on/off signal en. The drive switch 403 comprises a metal-oxide semiconductor (MOS) transistor 403*a*. The drain terminal of the MOS transistor 403*a* is connected to the print element 402. The source terminal of the MOS transistor 403*a* is connected to the ground line of the ground GNDH. The drive signal h output from the switch drive circuit 404 is supplied to the gate terminal of the MOS transistor 403*a*. The MOS transistor 403*a* is turned on/off in accordance with the drive signal h.

Figure 5:
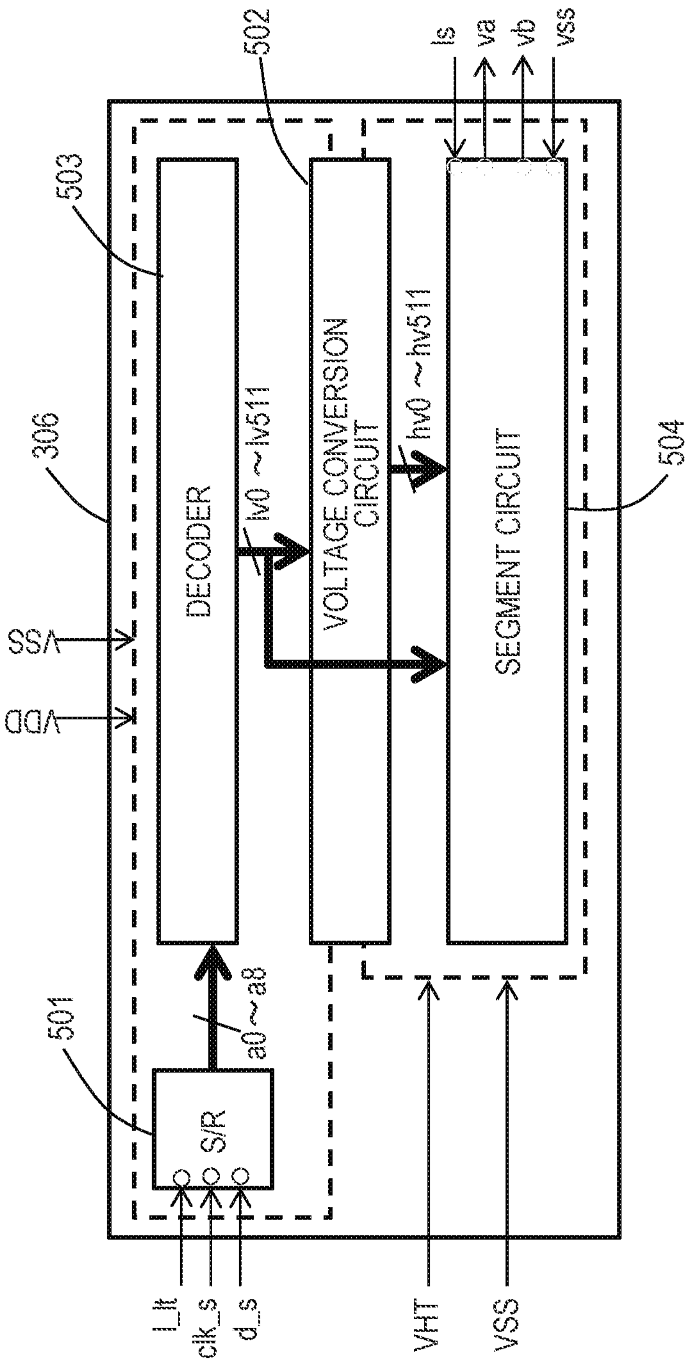
FIG. 5 is a block diagram showing a configuration of a temperature detection element circuit.

FIG. 5 is a block diagram showing the configuration of the temperature detection element circuit 306. The temperature detection element circuit 306 includes a shift register 501, a voltage conversion circuit 502, a decoder 503, and a segment circuit 504 of the temperature detection element. A power source voltage VDD is supplied to the shift register 501 and the decoder 503 to process an input/output signal of a small amplitude. Here, the power source voltage VDD is 3.3V. The shift register 501 takes in the selection information of the temperature detection element 111 through the latch signal l_lt, the transfer clock signal clk_s, and the serial data d_s from the data input circuit 304, and outputs 9 bits of selection data a0 to a8. The decoder 503 receives the selection data a0 to a8 and outputs selection signals lv0 to lv511 for selecting the temperature detection element circuit. The temperature detection element circuit 306 may be referred to as a temperature detection device. The voltage conversion circuit 502 and the decoder 503 can be referred to as a signal processing unit.

The voltage conversion circuit 502 operates when the power source voltage VDD and the power source voltage VHT are applied, and converts an input signal having a small amplitude whose voltage amplitude value corresponds to the power source voltage VDD into a signal having a large amplitude whose voltage amplitude value corresponds to the power source voltage VHT. Here, the power source voltage VDD is 3.3V and the power source voltage VHT is 5V.

The voltage conversion circuit 502 receives selection signals lv0 to lv511 having a voltage amplitude value of 3.3V and outputs selection signals hv0 to hv511 having a voltage amplitude value of 5V. The power source voltage VHT is the same as that supplied to the switch drive circuit 404 in the print element circuit 305.

The segment circuit 504 of the temperature detection element has 512 segments corresponding to segments seg0 to seg 511 of the print element circuit 305, and each segment is provided with a temperature detection element 111 corresponding to the print element 402. The segment circuit 504 operates when the power source voltage VHT is applied, receives selection signals lv0 to lv511 from the decoder 503, and receives selection signals hv0 to hv511 from the voltage conversion circuit 502. In the segment circuit 504, 1 segment out of 512 segments is selected according to the selection signals lv0 to lv511 and hv0 to hv511, and a constant current Is is supplied to the temperature detection element 111 through the wire. At the same time, terminal voltages va and vb at both ends of the temperature detection element 111 are output via the wire.

Figure 6:
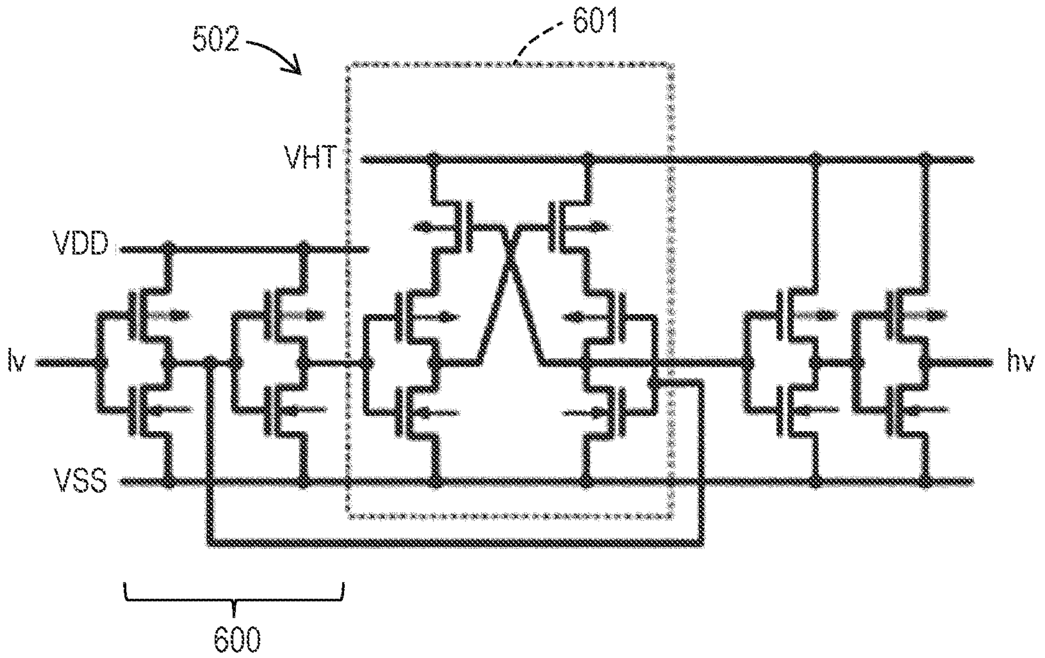
FIG. 6 is a circuit diagram showing the configuration of a voltage conversion circuit for one segment.

FIG. 6 is a circuit diagram showing the configuration of the voltage conversion circuit 502 for 1 segment. The voltage conversion circuit 502 has a pre-stage portion 600 operated by using the power source voltage VDD and a boosting portion 601 operated by using the power source voltage VHT.

The pre-stage portion 600 comprises two inverters to which the power source voltage VDD is supplied, and each inverter comprises a PMOS transistor and an NMOS transistor. An inverter in the preceding stage generates an inverted signal of the selection signal lv. The inverted signal is inputted to the inverter of the subsequent stage and also inputted to the boosting portion 601. The inverted signal is inverted again by the inverter of the subsequent stage, and then input to the boosting portion 601.

The boosting portion 601 is composed of a plurality of PMOS transistors and a plurality of NMOS transistors. The boosting portion 601 is composed of a symmetrical inverting circuit, but unlike the pre-stage portion 600, a PMOS transistor is connected in series to the terminal side of the power source voltage VHT. The gate of each PMOS transistor is connected to the output of the opposing inverting circuit. Therefore, when the output of one circuit is “H” (5 V), the gate of the opposing PMOS transistor becomes 5V, and the output of the circuit becomes “L” (0 V). When the output of the circuit becomes “L” (0 V), the gate of the opposing PMOS transistor becomes 0V, the PMOS transistor is turned on, and the output of the circuit becomes “H” (5 V). By this operation, a selection signal hv having an amplitude value of the power source voltage VHT is generated.

Figure 7:
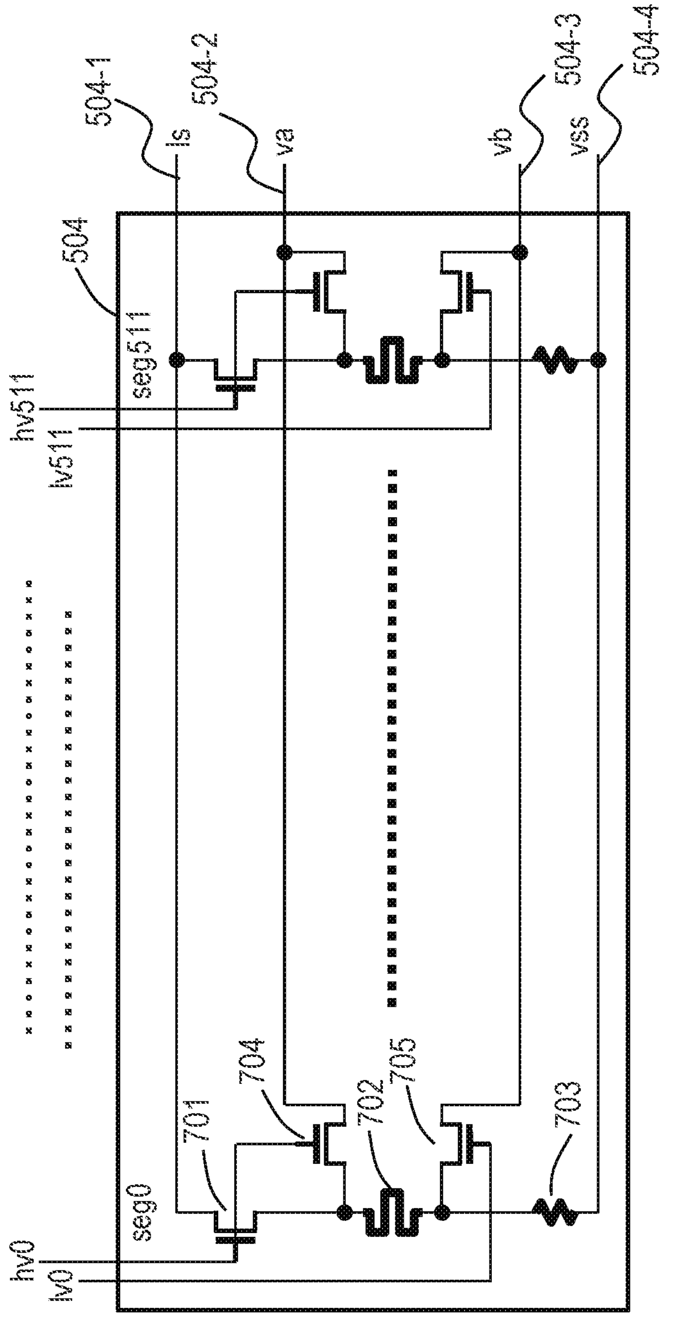
FIG. 7 is a circuit diagram showing a configuration of a segment circuit of a temperature detection element for one segment.

FIG. 7 is a circuit diagram showing the configuration of the segment circuit 504 of the temperature detection element for 1 segment. The segment circuit 504 of the temperature detection element has segments seg0 to seg511, and each segment has a selection switch 701, a temperature detection element 702, a first read switch 704, a second read switch 705, and a resistor 703. The temperature detection element 702 corresponds to the temperature detection element 111 shown in FIG. 1B. The selection switch 701, the first read switch 704, and the second read switch 705 are all made of NMOS transistors.

The drain terminal of the selection switch 701 is connected to the common wire 504-1 of the constant current Is. The source terminal of the selection switch 701 is connected to one terminal of the temperature detection element 702. The source terminal of the first read switch 704 is connected to a line connecting the source terminal of the selection switch 701 and one terminal of the temperature detection element 702. The drain terminal of the first read switch 704 is connected to the common wire 504-2 for reading the terminal voltage va.

The other terminal of the temperature detection element 702 is connected to the ground line 504-4 of the ground VSS via the resistor 703 for defining an operating point. The ground line 504-4 is a return destination of the constant current Is. The source terminal of the second read switch 705 is connected to a line connecting the other terminal of the temperature detection element 702 and the resistor 703. The drain terminal of the second read switch 705 is connected to the common wire 504-3 for reading the terminal voltage vb.

In the segment seg0, the selection signal hv0 is supplied to the gate terminals of the selection switch 701 and the first read switch 704, and the selection signal lv0 is supplied to the gate terminal of the second read switch 705. The selection switch 701 and the first read switch 704 are turned on/off in accordance with the selection signal hv0. The second read switch 705 is turned on/off in accordance with the selection signal lv0.

Segments seg1 to seg511 also have the same connection structure as segment seg0. In segments seg1 to seg511, the selection switch 701 and the first read switch 704 are turned on/off in accordance with the selection signals hv1 to hv511, and the second read switch 705 is turned on/off in accordance with the selection signals lv1 to lv511.

Next, the operation from the selection of the temperature detection element in the print element substrate 101 shown in FIG. 3 to the output of the determination data will be described.

Figure 8:
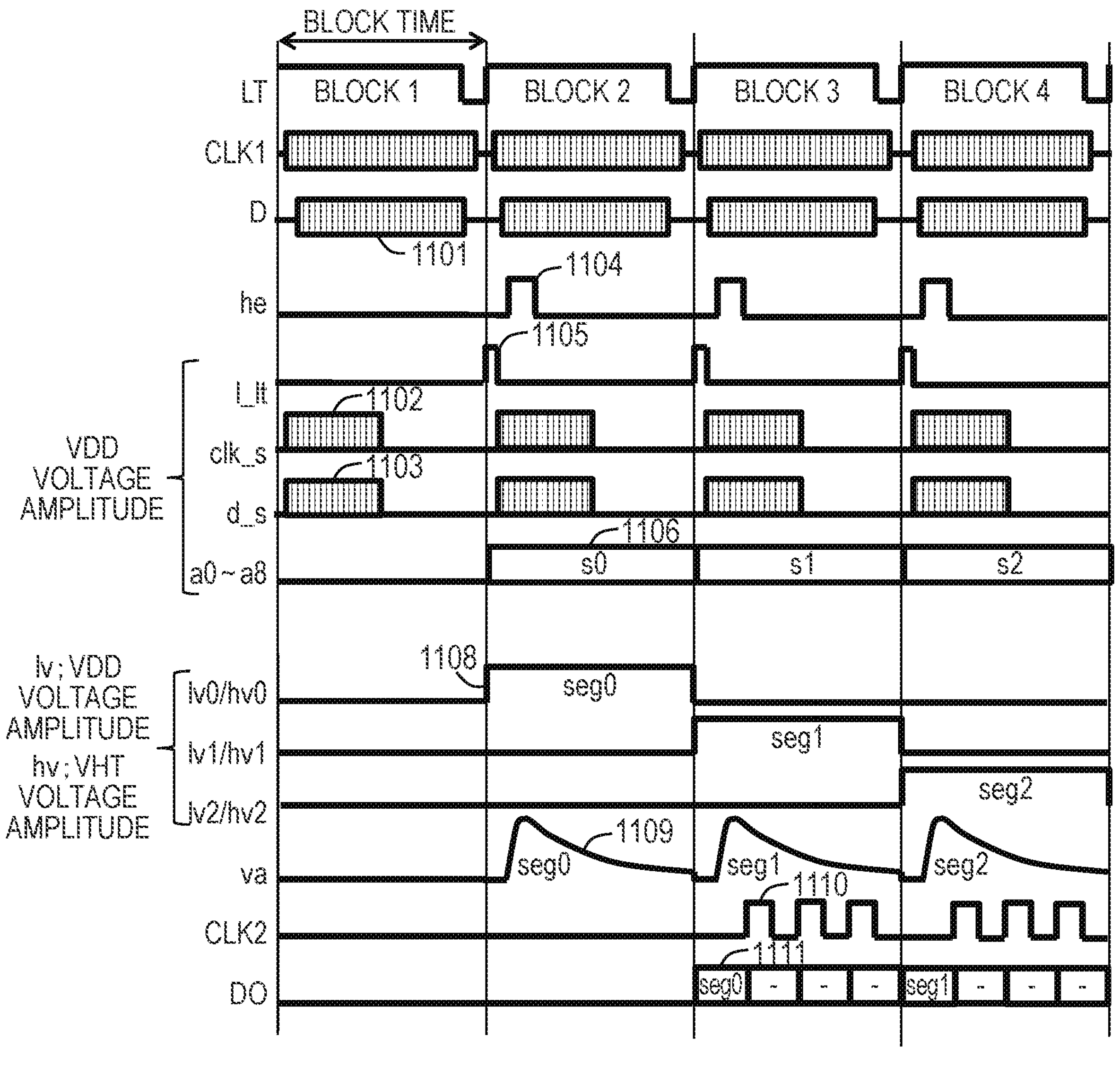
FIG. 8 is a timing diagram illustrating the operation of the print element substrate.

FIG. 8 is a timing diagram for explaining the operation of the print element substrate 101. As shown in FIG. 8, during the period of block 1, the data input circuit 304 detects the selection information 1101 of the temperature detection element and outputs the transfer clock signal clk_s (1102) and the serial data d_s (1103). Data is transferred to the temperature detection element circuit 306 and the inspection circuit 308. The selection information 1101 is taken into the shift register 501 in the temperature detection element circuit 306.

In the period of block 2, the selection information 1101 captured by the temperature detection element circuit 306 is latched in accordance with the latch signal l_lt (1105), and the selection data a0 to a8 (1106) are output. In response to this, the decoder 503 outputs a selection signal lv (1108) of seg0 and a voltage-converted selection signal hv (1108). In FIG. 8, reference numeral 1108 denotes the timing of both the selection signal lv and the selection signal hv.

On the other hand, although not shown in FIG. 8, the selection data of the print element corresponding to the temperature detection element is given to select the print element. When the print element of seg0 is selected, a pulse (1104) of the application signal he is supplied to the selected print element, and a temperature waveform (1109) of the temperature detection element of seg0 is obtained. An inspection circuit 308 receives the temperature waveform, determines whether the ejection is normal or not, and holds the determination data. During this time, the selection information of the next temperature detection element is transferred.

During the period of block 3, the held determination data (1111) is output to the data line of the serial data signal Do at the timing of the latch signal l_lt, and is transferred in synchronization with the transfer clock signal CLK2 (1110). The same process is repeated after block 3.

Figure 9A:
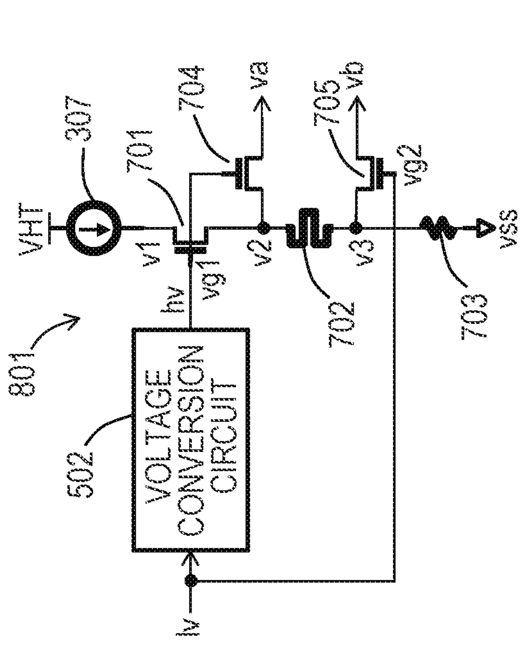
FIG. 9A is a diagram for explaining the operating voltage range of the temperature sensing element circuit.
Figure 9B:
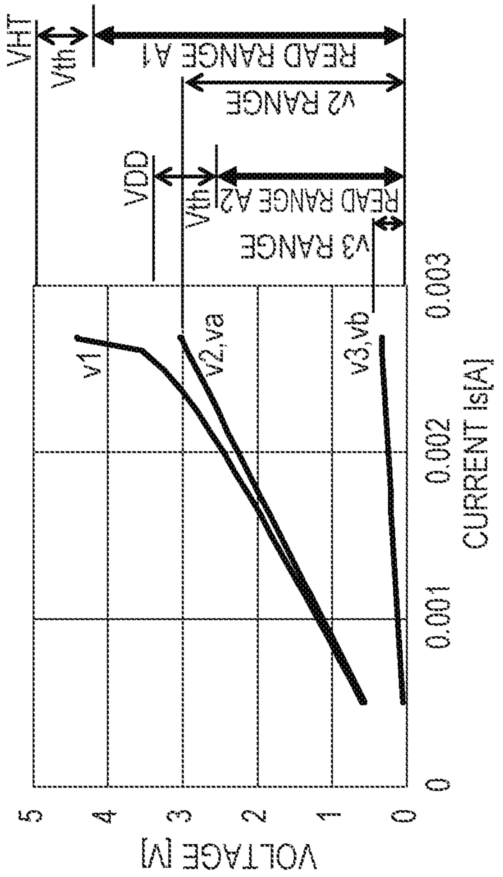
FIG. 9B is a diagram for explaining the operating voltage range of the temperature sensing element circuit.
Figure 9C:
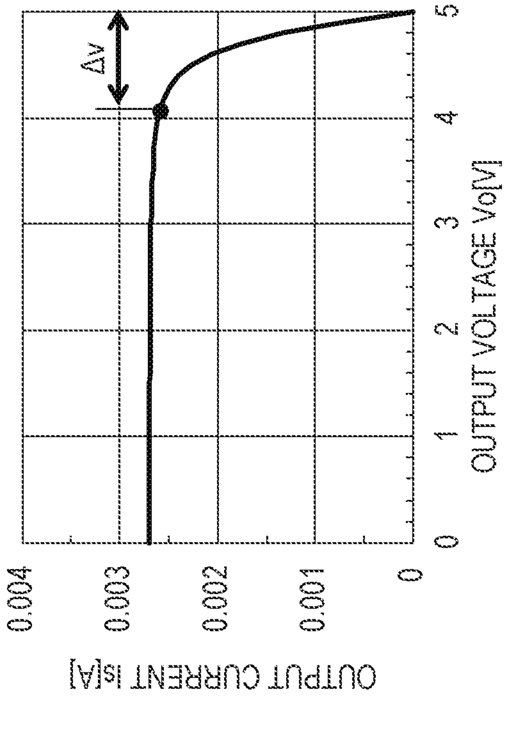
FIG. 9C is a diagram for explaining the operating voltage range of the temperature sensing element circuit.
Figure 9D:
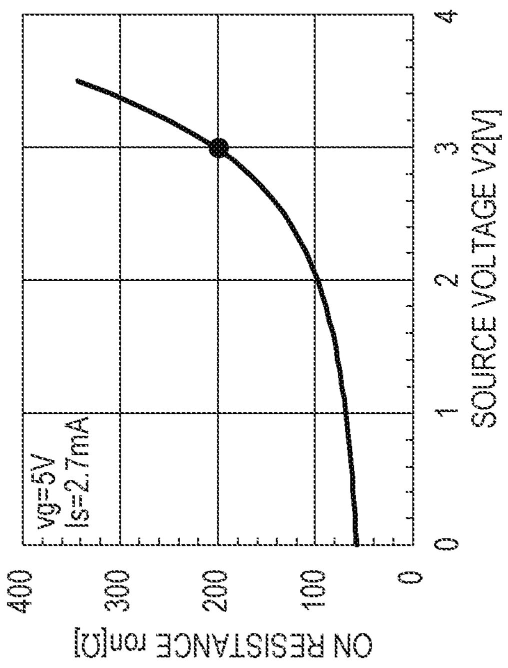
FIG. 9D is a diagram for explaining the operating voltage range of the temperature sensing element circuit.

Next, the operation voltage range of the temperature detection element circuit 306 will be described. FIGS. 9A to 9D are diagrams for explaining the operation voltage range of the temperature detection element circuit 306. FIG. 9A is a block diagram showing the configuration of the segment circuit 801 of the temperature detection element for 1 segment. FIG. 9B is a graph showing the relationship between the voltage of each portion of the segment circuit 801 of the temperature detection element and the constant current Is. FIG. 9C is a characteristic diagram showing a drop in the output voltage of the current source 307. FIG. 9D is a characteristic diagram showing the on-resistance characteristics of the selection switch 701.

In the segment circuit 801 shown in FIG. 9A, a selection signal lv having a voltage amplitude value of 3.3V is supplied to the gate terminals of the voltage conversion circuit 502 and the second read switch 705. The voltage conversion circuit 502 converts the selection signal lv into a selection signal hv having a voltage amplitude value of 5V. The selection signal hv is supplied to the gate terminals of the selection switch 701 and the first read switch 704. The selection switch 701 and the first read switch 704 are driven in accordance with the selection signal hv, and the second read switch 705 is driven in accordance with the selection signal lv. The segment circuit 801 constitutes each segment of the segment circuit 504 shown in FIG. 5.

The current source 307 operates using a power source voltage VHT (5V). The current source 307 supplies a constant current Is to one terminal of the temperature detection element 702 via the selection switch 701. When the selection switch 701 is turned on, a constant current Is flows through the temperature detection element 702. When the first read switch 704 is turned on, the terminal voltage va of one terminal of the temperature detection element 702 is output. When the second read switch 705 is turned on, the terminal voltage vb of the other terminal of the temperature detection element 702 is output.

As shown in FIG. 9B, the drain voltage v1 of the selection switch 701, the voltage v2 (terminal voltage va) on one terminal side of the temperature detection element 702, and the voltage v3 (terminal voltage vb) on the other terminal side increase as the constant current Is increases. The voltage (v2 to v3) between terminals of the temperature detection element 702 is temperature information. Here, the current source 307 has the output characteristic shown in FIG. 9C, and produces a voltage drop of 0.9V for 2.7 mA (Δv indicates an output voltage drop). The selection switch 701 has an on-resistance characteristic shown in FIG. 9D (a range of 60 to 200Ω of on-resistance ron with respect to a range of 0 to 3 V of voltage v2). The resistance value of the temperature detection element 702 is 1 kΩ, and the resistance value of the operation point resistor 703 is 100Ω.

According to the output characteristic of the current source 307, the constant current range is a maximum of about 2.7 mA, and the voltage v2 becomes a maximum of 3V. On the other hand, the threshold voltage vth between the gate and the source of the first read switch 704 is 0.6V. When the selection signal hv (=vg1) is 5V, the read range A1 of the first read switch 704 becomes 4.4V (=vg1−vth=5V−0.6V) or less. In this case, since the temperature detection element circuit 306 operates in the relation of the read range A1>v2, correct temperature information can be read.

On the other hand, the threshold voltage vth between the gate and the source of the second read switch 705 is 0.6V. When the selection signal lv (=vg2) is 3.3V, the read range A2 of the second read switch 705 becomes 2.7V (=vg2−vth=3.3V−0.6V) or less. In this case, since the temperature detection element circuit 306 operates in the relation of the read range A2>v3, the correct temperature information can be read. Although the threshold voltage Vth of the first read switch 704 is slightly larger than the threshold voltage Vth of the second read switch 705, both threshold voltages Vth are expressed as the same value (0.6V) in order to simplify the description.

Comparative Example

Figure 10A:
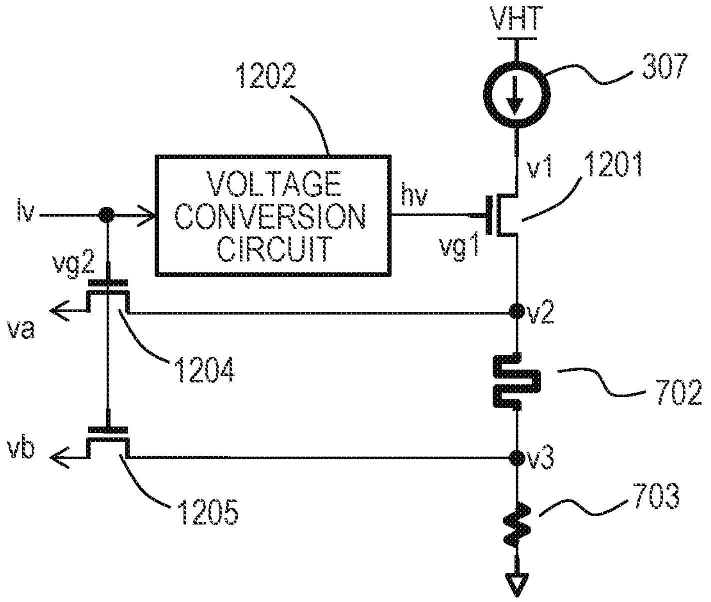
FIG. 10A is a diagram for explaining the operating voltage range of the temperature detecting element circuit of the comparative example.
Figure 10B:
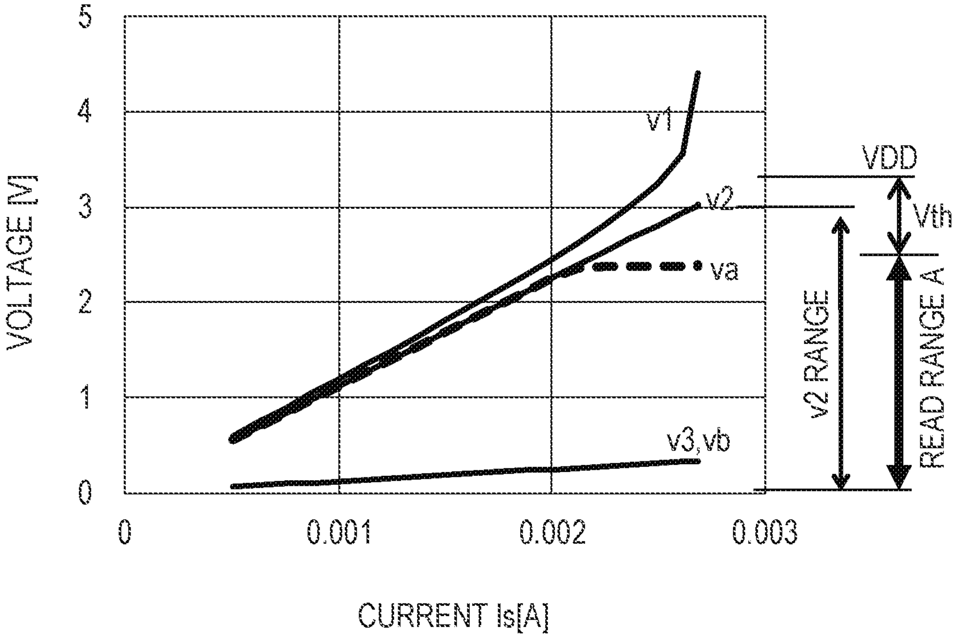
FIG. 10B is a diagram for explaining the operating voltage range of the temperature detecting element circuit of the comparative example

Next, the operating voltage range of the temperature detection element circuit of the comparative example will be described. FIGS. 10A and 10B are diagrams for explaining the operation voltage range of the temperature detection element circuit of the comparative example. FIG. 10A is a block diagram showing a segment circuit and a voltage conversion circuit of the temperature detection element for 1 segment. FIG. 10B is a graph showing the relationship between the voltage of each portion of the segment circuit and the constant current Is.

The segment circuit shown in FIG. 10A includes a selection switch 1201, a temperature detection element 702, a first read switch 1204, a second read switch 1205, and a resistor 703. The current source 307, the temperature detection element 702, 0 and the resistor 703 are the same as those shown in FIG. 9A. The selection switch 1201, the first read switch 1204, and the second read switch 1205 are all made of NMOS transistors.

The drain terminal of the selection switch 1201 is connected to the current source 307, and the source terminal is connected to one terminal of the temperature detection element 702. The source terminal of the first read switch 1204 is connected to a line connecting the source terminal of the selection switch 1201 and one terminal of the temperature detection element 702. The source terminal of the second read switch 1205 is connected to a line connecting the other terminal of the temperature detection element 702 and the resistor 703.

A selection signal lv having a voltage amplitude value of 3.3V is supplied to the voltage conversion circuit 1202 and the gate terminals of the first read switch 1204 and the second read switch 1205. The voltage conversion circuit 1202 converts the selection signal lv into a selection signal hv having a voltage amplitude value of 5V. The selection signal hv is supplied to the gate terminal of the selection switch 1201. The selection switch 1201 is driven in accordance with the selection signal hv, and the first read switch 1204 and the second read switch 1205 are driven in accordance with the selection signal lv.

As shown in FIG. 10B, the drain voltage v1 of the selection switch 1201, the voltage v2 (terminal voltage va) on one terminal side of the temperature detection element 702, and the voltage v3 (terminal voltage vb) on the other terminal side increase as the constant current Is increases. In the graph of FIG. 10B, the conditions described in the description of the graph of FIG. 9B are also used.

The constant current range of the current source 307 is a maximum of about 2.7 mA, at which time the voltage v2 becomes a maximum of 3V. Both the first read switch 1204 and the second read switch 1205 have a threshold voltage vth between the gate and the source of 0.6V. When the selection signal lv (=vg2) is 3.3V, the read range A becomes 2.7V (=vg2−vth=3.3V−0.6V) or less. In this case, since the temperature detection element circuit operates in the relation of the read range A<v2 range, the temperature information cannot be read correctly.

As described above, according to the print element substrate 101 of the present disclosure, when the operating range of the current source 307 is expanded by increasing the power source voltage, not only the selection switch 701 but also the first read switch 704 are driven by using the selection signal hv boosted by the voltage conversion circuit 502. Thus, the voltage drop of the selection switch 701 can be suppressed, and the input voltage range of the first read switch 704 can be made to correspond to the operating voltage range of the temperature detection element 702 operating within the voltage range of the power source voltage VHT. Therefore, the S/N ratio of the temperature detection signal (temperature information) can be increased, and the terminal voltage of the temperature detection element 702 can be accurately read in accordance with the expanded temperature detection voltage range. As a result, it is possible to improve the judgment accuracy of the ejection failure.

In the print element substrate 101 of this embodiment, a high breakdown voltage element is used for the selection switch 701 and the first read switch 704 on the high potential side, but a low breakdown voltage element can be used for the second read switch 705 on the low potential side. The element size of the low breakdown voltage element is smaller than that of the high breakdown voltage element. For example, in the case of a MOS transistor, in order to increase the breakdown voltage, there are measures in the vertical direction (depth direction) and measures in the horizontal direction (area direction). Basically, since it is necessary to lower the electric field strength, in the case of a lateral countermeasure, it is necessary to provide a layer with a low concentration and to separate the distance between the source and the drain. Therefore, the area of the high breakdown voltage MOS transistor is larger than that of the low breakdown voltage MOS transistor. Considering the area of the entire read circuit, since the second read switch 705 on the low potential side can be miniaturized, an increase in the area can be suppressed.

In the print element substrate 101 of the present embodiment, the power source voltage VHT and the power source voltage VDD may be supplied to the segment circuit 802 of the print element shown in FIG. 4B and the segment circuit 801 of the temperature detection element shown in FIG. 9A in common.

Figure 11:
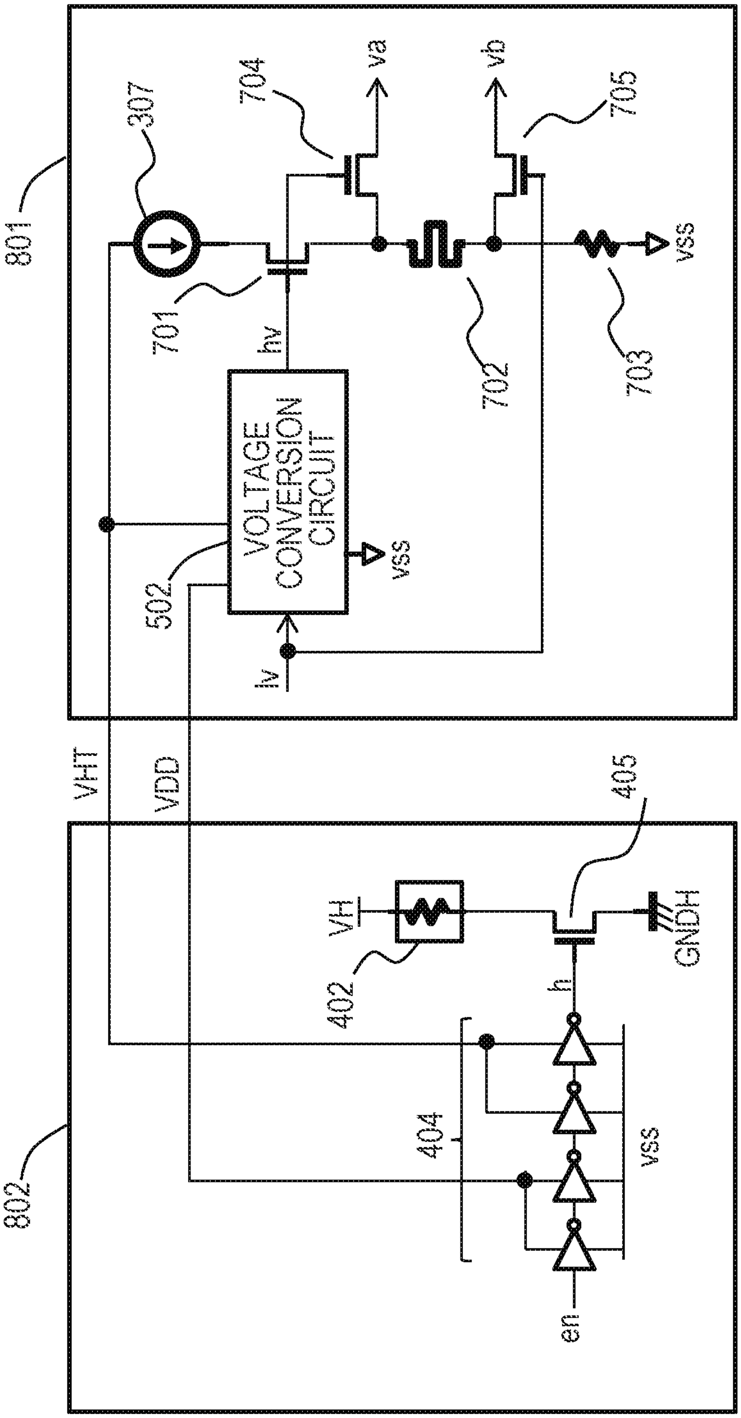
FIG. 11 is a block diagram showing a configuration of a common power supply between a segment circuit of a print element and a segment circuit of a temperature detection element.

FIG. 11 is a block diagram showing a configuration of a common power source between the segment circuit 802 of the print element and the segment circuit 801 of the temperature detection element. As shown in FIG. 11, the power source voltage VDD is supplied to the switch drive circuit 404 of the segment circuit 802 and the voltage conversion circuit 502 of the segment circuit 801 via a common power source line. The power source voltage VHT is supplied to the switch drive circuit 404 of the segment circuit 802, and to the voltage conversion circuit 502 of the segment circuit 801, and the current source 307 via a common power source line. In other words, the power source voltage of the switch drive circuit 404 and the power source voltage of the voltage conversion circuit 502 are common. By sharing the power source voltage VDD and the power source voltage VHT between the segment circuit 802 of the print element and the segment circuit 801 of the temperature detection element in this way, the circuit layout can be made efficient and space saving can be achieved.

Second Embodiment

Figure 12A:
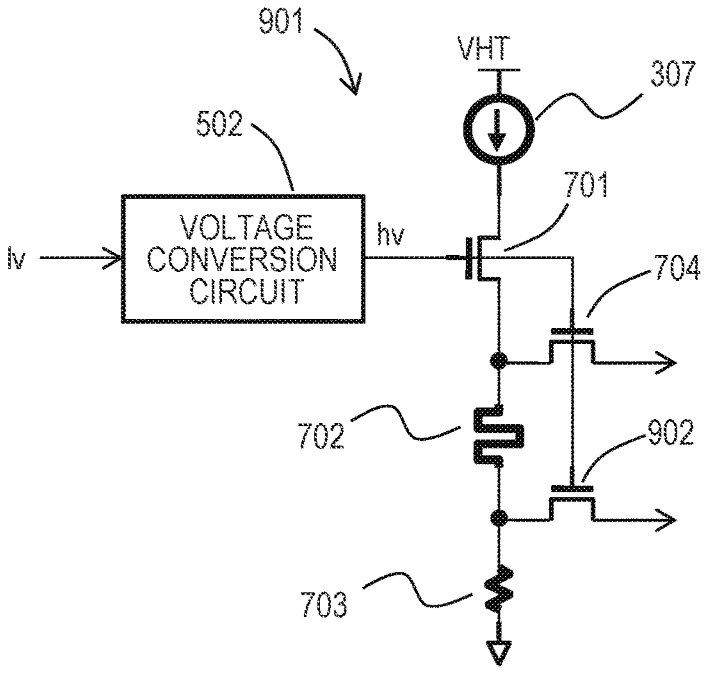
FIG. 12A is a diagram for explaining a structure of a print element substrate according to a second embodiment of the present disclosure.
Figure 12B:
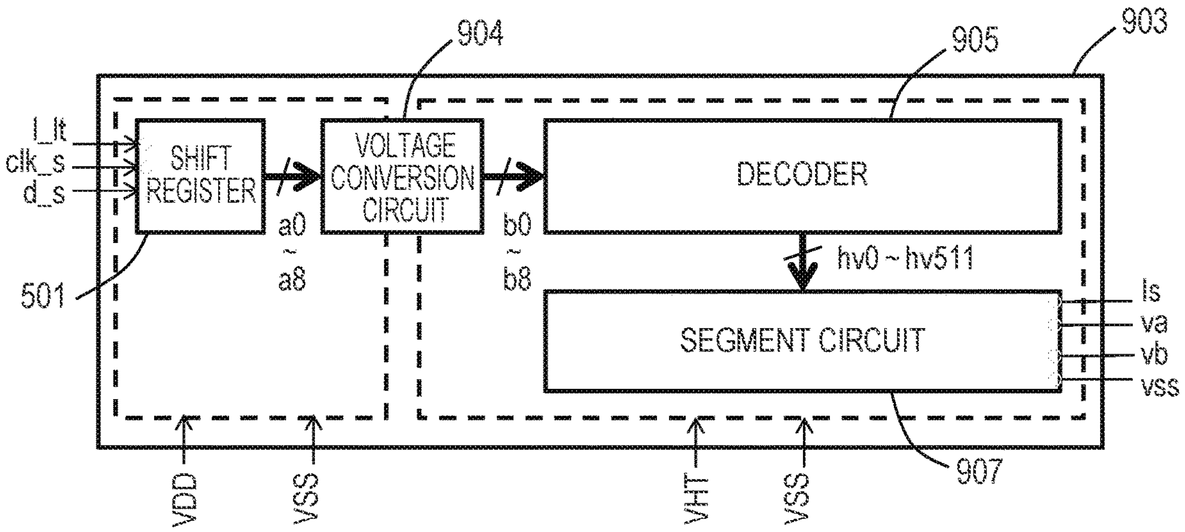
FIG. 12B is a diagram for explaining a structure of a print element substrate according to a second embodiment of the present disclosure.

FIGS. 12A and 12B are diagrams for explaining the configuration of the print element substrate according to the second embodiment of the present disclosure. FIG. 12A is a block diagram showing the configuration of the segment circuit 901 of the temperature detection element for 1 segment. FIG. 12B is a block diagram showing the configuration of a temperature detection element circuit 903 applied to the segment circuit 901.

The segment circuit 901 shown in FIG. 12A is different from the segment circuit 901 shown in FIG. 9A in that it has a second read switch 902 in place of the second read switch 705. The second read switch 902 comprises an NMOS transistor. The source terminal of the second read switch 902 is connected to a line connecting the other terminal of the temperature detection element 702 and the resistor 703. Although not shown in FIG. 12A, the drain terminal of the second read switch 902 is connected to the common wire 504-3 (see FIG. 7) for reading the terminal voltage vb. The segment circuit 901 constitutes each segment of the segment circuit 504 shown in FIG. 5. In this case, the decoder 503 supplies the selection signals lv 0 to lv511 to the voltage conversion circuit 502, but not to the segment circuit 504.

In the segment circuit 901 shown in FIG. 12A, the voltage conversion circuit 502 converts the small amplitude selection signal lv having a voltage amplitude value of 3.3V into the large amplitude selection signal hv having a voltage amplitude value of 5V. The selection signal hv is supplied to the gate terminals of the selection switch 701, the first read switch 704, and the second read switch 902. When the selection switch 701 is turned on, a constant current Is flows via the temperature detection element 702. When the first read switch 704 is turned on, the terminal voltage va of one terminal of the temperature detection element 702 is output. When the second read switch 902 is turned on, the terminal voltage vb of the other terminal of the temperature detection element 702 is output.

According to the print element substrate of this embodiment, as in the first embodiment, the S/N ratio of the temperature detection signal (temperature information) can be increased, and the terminal voltage of the temperature detection element 702 can be read out accurately.

Since a high breakdown voltage element is used for the second read switch 902, the element size is slightly larger than in the first embodiment. However, since the selection signal hv can be supplied to the selection switch 701, the first read switch 704 and the second read switch 902 by a common wire, the wire space can be reduced. Therefore, the increase in the element size and the reduction in the wire space are offset, and the increase in the area of the entire read circuit can be suppressed.

In the print element substrate of the present embodiment, the temperature detection element circuit 903 shown in FIG. 12B may also be used. The temperature detection element circuit 903 includes a shift register 501, a voltage conversion circuit 904, a decoder 905, and a segment circuit 907 of the temperature detection element. The shift register 501 is the same as that shown in FIG. 5. The temperature detection element circuit 903 may be referred to as a temperature detection device. The voltage conversion circuit 904 and the decoder 905 can be referred to as a signal processing unit.

The voltage conversion circuit 904 operates when the power source voltage VDD and the power source voltage VHT are supplied, and converts an input signal having a small amplitude whose voltage amplitude value corresponds to the power source voltage VDD into a signal having a large amplitude whose voltage amplitude value corresponds to the power source voltage VHT. Here, the power source voltage VDD is 3.3V and the power source voltage VHT is 5V.

The voltage conversion circuit 904 receives the selection data a0 to a8 having a voltage amplitude value of 3.3V and outputs the selection data b0 to b8 having a voltage amplitude value of 5V.

The decoder 905 is composed of a high breakdown voltage element and is operated by supplying a power source voltage VHT. The decoder 905 receives the selection data b0 to b8 and outputs selection signals hv0 to hv511 having a voltage amplitude value of 5V.

Like the segment circuit 504 shown in FIG. 5, the segment circuit 907 of the temperature detection element has 512 segments, and each segment comprises the segment circuit 901 shown in FIG. 12A. In the segment circuit 907, 1 segment out of 512 segments is selected according to the selection signals hv0 to hv511, and a constant current Is is supplied to the temperature detection element 702 via the wire. At the same time, terminal voltages va and vb at both ends of the temperature detection element 702 are output via the wire.

The temperature detection element circuit 903 can also increase the S/N ratio of the temperature detection signal (temperature information) and read the terminal voltage of the temperature detection element 702 accurately. Since the decoder 905 needs to be composed of high breakdown voltage elements, the element size of the decoder 905 is slightly larger than that of the temperature detection element circuit 306. However, the number of signal lines can be reduced by arranging the voltage conversion circuit 904 in the preceding stage of the decoder 905, and the circuit scale of the voltage conversion circuit 904 can be reduced. Therefore, the increase in the element size and the reduction in the circuit size are offset, and the increase in the area of the entire circuit can be suppressed.

Third Embodiment

Figure 13:
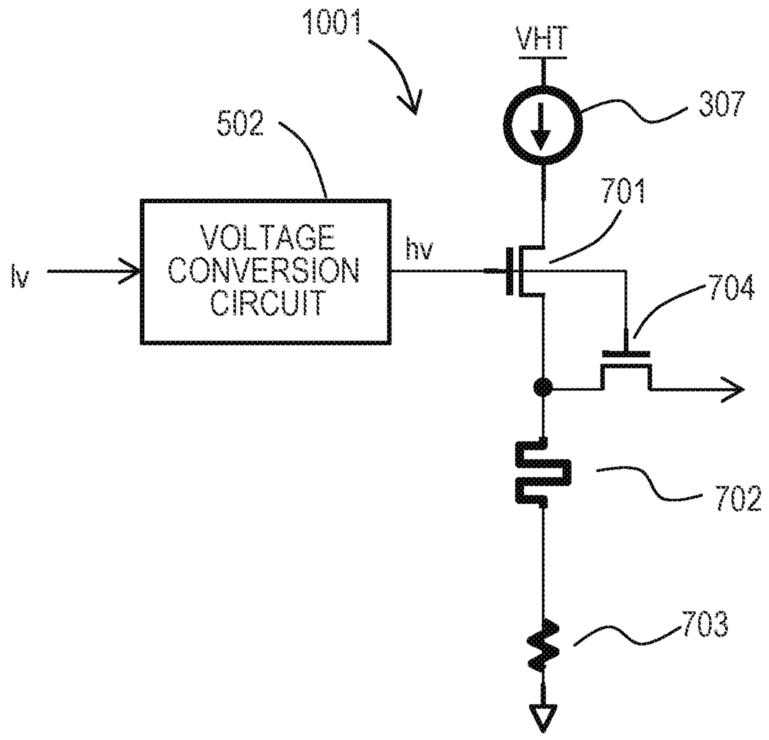
FIG. 13 illustrates a configuration of a recording element substrate according to a third embodiment of the present disclosure.

FIG. 13 is a diagram for explaining the configuration of the print element substrate according to the third embodiment of the present disclosure. FIG. 13 shows the structure of the segment circuit 1001 of the temperature detection element for 1 segment. The segment circuit 1001 is formed by removing the second read switch 705 from the configuration of the segment circuit 901 shown in FIG. 9A. The segment circuit 1001 constitutes each segment of the segment circuit 504 shown in FIG. 5. In this case, the decoder 503 supplies the selection signals lv0 to lv511 to the voltage conversion circuit 502, but not to the segment circuit 504.

In the segment circuit 1001, when the selection switch 701 is turned on, the constant current Is flows via the temperature detection element 702. When the first read switch 704 is turned on, the terminal voltage of one terminal (terminal on the high potential side) of the temperature detection element 702 is output as temperature information.

Also in the print element substrate of the present embodiment, the S/N ratio of the temperature detection signal (temperature information) can be increased, and the terminal voltage of the temperature detection element 702 can be read out accurately. Compared with the segment circuit 901 shown in FIG. 9A, it is affected by the wire resistance of VSS according to the segment position, but by sufficiently reducing the wire resistance value, detection accuracy equivalent to that of the segment circuit 901 can be obtained. Further, since the circuit configuration of the segment circuit 1001 is simpler than that of the segment circuit 901, the circuit layout can be made efficient and space saving can be achieved.

In the print element substrate of each of the above-described embodiments, the connection relationship between the drain terminal and the source terminal may be reversed with respect to the selection switch, the first read switch, and the second read switch. In this case, in the above description, the terms "drain terminal" and "source terminal" are replaced with "source terminal" and "drain terminal", respectively.

A temperature detection apparatus according to another embodiment of the present disclosure comprises a temperature detection element, a current source for supplying a constant current to the temperature detection element, a first MOS transistor, and a second MOS transistor. In the first MOS transistor, one terminal of two terminals other than a gate terminal is connected to one end of a temperature detection element, the other terminal is connected to a current source, and a selection signal is supplied to the gate terminal. In the second MOS transistor, one terminal of two terminals other than the gate terminal is connected to a line connecting one end of the temperature detection element and one terminal of the first MOS transistor, and the selection signal is supplied to the gate terminal. In the first and second MOS transistors, two terminals other than the gate terminal are a drain terminal and a source terminal. The threshold voltage between the gate terminal of the second MOS transistor and one terminal is assumed as V1, and the voltage applied to the gate terminal is assumed as V2. Here, one end of the temperature detection element is a terminal on the high potential side. For example, when one terminal is a drain terminal, the threshold voltage V1 is a threshold voltage between the gate and the drain. The voltage amplitude value of the selection signal is amplified so that the value obtained by subtracting the threshold voltage V1 from the supplied voltage V2 becomes larger than the value of the terminal voltage generated at one end of the temperature detection element when the constant current is supplied to the temperature detection element via the first MOS transistor. The voltage amplitude value of the selection signal may be the value of the power source voltage for operating the current source.

In the temperature detection device of the present embodiment, when the operating range of the current source is expanded by increasing the power source voltage, the input voltage range of the second MOS transistor can be made to correspond to the operating voltage range of the temperature detection element operating within the voltage range of the power source voltage. In addition, the voltage drop of the first MOS transistor can be suppressed. Therefore, the S/N ratio of the temperature detection signal (temperature information) can be increased, and the terminal voltage of the temperature detection element can be read out accurately.

According to the present disclosure, the S/N ratio of the temperature detection signal (temperature information) can be increased, and the terminal voltage of the temperature detection element can be read out accurately.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-093618, filed Jun. 3, 2021, which is hereby incorporated by reference herein in its entirety.

What is claimed is:

1. A print element substrate comprising:

a plurality of print elements configured to generate thermal energy for ejecting liquid; and a temperature detection element circuit including a plurality of temperature detection elements provided corresponding to each of the plurality of print elements, configured to read temperature information by selectively energizing one of the plurality of temperature detection elements, wherein the temperature detection element circuit includes:

a signal processing portion configured to output a selection signal having a second voltage amplitude larger than a first voltage amplitude, based on an input signal having the first voltage amplitude;

a selection switch provided for each of the plurality of temperature detection elements, configured to select the temperature detection element; and a first read switch provided for each of the plurality of temperature detection elements, configured to read a voltage of a terminal of one of the temperature detection element selected by the selection switch, and wherein the selection switch and the first read switch are driven by using the selection signal.

2. The print element substrate according to claim 1, wherein the temperature detection element circuit is provided for each of the plurality of temperature detection elements, and includes a second read switch configured to read a voltage of the other terminal of the temperature detection element selected by the selection switch, and wherein the second read switch is driven by using the input signal having the first voltage amplitude.

3. The print element substrate according to claim 2, wherein a withstand voltage of the second read switch is lower than a withstand voltage of the first read switch.

4. The print element substrate according to claim 1, wherein the selection signal is supplied to the selection switch and the first read switch via a common wire.

5. The print element substrate according to claim 1, wherein the temperature detection element circuit is provided for each of the plurality of temperature detection elements, and includes a second read switch configured to read a voltage of the other terminal of the temperature detection element selected by the selection switch, and wherein the second read switch is driven by using the selection signal.

6. The print element substrate according to claim 5, wherein the selection signal is supplied to the selection switch, the first read switch, and the second read switch, via a common wire.

7. The print element substrate according to claim 1, further comprising a current source configured to apply a constant current to the temperature detection element, wherein one end of the temperature detection element is electrically connected to the current source via the selection switch and is connected to the first read switch, and wherein the second voltage amplitude is the same value as a power supply voltage for operating the current source.

8. The print element substrate according to claim 7, wherein the other end of the temperature detection element is connected to a wire which is a return destination of the constant current via a resistor.

9. The print element substrate according to claim 1, wherein the signal processing portion includes:

a decoder configured to output a selection signal having the first voltage amplitude based on selection data for selecting the temperature detection element; and a voltage conversion circuit configured to convert the selection signal having the first voltage amplitude output by the decoder into the selection signal having the second voltage amplitude.

10. The print element substrate according to claim 9, further comprising a print element circuit configured to selectively energize one of the plurality of print elements, wherein the print element circuit includes a switch for selecting the print element and a switch drive circuit for turning the switch on and off, and wherein the power supply voltage supplied to the switch driving circuit and the power supply voltage supplied to the voltage conversion circuit are common.

11. The print element substrate according to claim 1, wherein the signal processing portion includes:

a voltage conversion circuit configured to convert selection data having the first voltage amplitude for selecting the temperature detection element into selection data having the second voltage amplitude;

a decoder configured to output a selection signal having the second voltage amplitude based on the selection data having the second voltage amplitude output by the voltage conversion circuit.

12. The print element substrate according to claim 1, wherein the temperature detection element is disposed in the vicinity of the print element.

* * * * *